(12) United States Patent
Hong et al.

(10) Patent No.: US 9,660,571 B2
(45) Date of Patent: May 23, 2017

(54) METHOD FOR HYBRID SOLAR TRACKING, AND APPARATUS FOR HYBRID SOLAR TRACKING AND PHOTOVOLTAIC BLIND SYSTEM USING SAME

(71) Applicant: Industry-Academic Cooperation Foundation, Yonsei University, Seoul (KR)

(72) Inventors: Tae Hoon Hong, Seoul (KR); Choong Wan Koo, Yongin (KR); Kwang Bok Jeong, Seoul (KR); Ji Min Kim, Seoul (KR); Cheol Woo Ban, Seoul (KR); Min Hyun Lee, Seoul (KR); Chang Yoon Ji, Bucheon (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 14/979,658

(22) Filed: Dec. 28, 2015

(65) Prior Publication Data

US 2016/0190981 A1 Jun. 30, 2016

(30) Foreign Application Priority Data

Dec. 31, 2014 (KR) ........................ 10-2014-0196084

(51) Int. Cl.
| | | |
|---|---|---|
| H02S 20/32 | (2014.01) | |
| H02S 50/00 | (2014.01) | |
| G05B 13/04 | (2006.01) | |
| G06N 3/02 | (2006.01) | |

(52) U.S. Cl.
CPC ............ *H02S 20/32* (2014.12); *G05B 13/048* (2013.01); *G06N 3/02* (2013.01); *H02S 50/00* (2013.01); *Y02B 10/10* (2013.01); *Y02B 80/50* (2013.01)

(58) Field of Classification Search
None
See application file for complete search history.

(56) References Cited

U.S. PATENT DOCUMENTS

| 9,170,033 B2* | 10/2015 | Kroyzer | ..................... F24J 2/38 |
| 2011/0224831 A1* | 9/2011 | Beardsworth | ............. F24J 2/38 |
| | | | 700/275 |
| 2012/0211001 A1* | 8/2012 | Elshafei | ..................... F24J 2/38 |
| | | | 126/601 |

OTHER PUBLICATIONS

Charron, R. et al. "Optimization of the performance of double-facades with integrated photovoltaic panels and motorized blinds." Solar Energy 80.5 (2006): 482-491.*

* cited by examiner

*Primary Examiner* — Kakali Chaki
*Assistant Examiner* — Eric Nilsson
(74) *Attorney, Agent, or Firm* — Lex IP Meister, PLLC (57) ABSTRACT

A method for hybrid solar tracking, and an apparatus for hybrid solar tracking and a photovoltaic blind system using the same are disclosed. The method includes generating first predicted power output data by analyzing first measured power output data of the past; generating a lagged error; constructing a regression analysis (RA) model, and deriving second predicted power output data; constructing an artificial neural network (ANN) model, and deriving third predicted power output data; selecting either a method for solar tracking based on photovoltaic power output or a method for solar tracking based on location and time depending on whether the second measured power output data of the present time falls within a filtering range based on a first error range and a second error range; and determining the directions of photovoltaic panels according to the selected method for solar tracking.

5 Claims, 7 Drawing Sheets

METHOD FOR HYBRID SOLAR TRACKING, AND APPARATUS FOR HYBRID SOLAR TRACKING AND PHOTOVOLTAIC BLIND SYSTEM USING SAME

CROSS-REFERENCE TO RELATED APPLICATION(S)

This application claims the benefit under 35 USC 119(a) of Korean Patent Application No. 10-2014-0196084 filed on Dec. 31, 2014 in the Korean Intellectual Property Office, the entire disclosure of which is incorporated herein by reference for all purposes.

BACKGROUND

Field

The present invention relates to a photovoltaic blind system.

Description of the Related Art

Photovoltaic power generation may be implemented in various forms because this type of power generation does neither entail noise, nor require special geographical features and a wide site, compared to other types of renewable energy generation. Of these various forms, technology for a building integrated photovoltaic (BIPV) system in which photovoltaic power generation panels are installed on a building has been developed.

A BIPV system may have a structure that is combined with a component of a building, such as a roof, a glass window, or the finishing material of an outer wall, because it utilizes places of a building on which solar light is incident. In particular, a structure that can be easily integrated with a building and allows its direction to be controlled by tracking the incident direction of solar light will be advantageous.

Accordingly, there has been proposed a photovoltaic blind system in which solar battery panels are combined with the slats of a blind system installed in order to block light from the outside to the inside or from the inside to the outside, thereby implementing both of blocking light and generating photovoltaic power.

It is expected that a photovoltaic blind system, constructed upon a large building whose outer walls are generally finished with glasses, can produce a considerable amount of renewable energy.

A photovoltaic blind system requires solar tracking ability for tracking the incident direction of solar light in order to maximize the amount of photovoltaic power generation. Previous studies suggest that a one-axis solar tracking technique capable of changing the angles of photovoltaic panels only in a horizontal direction or a vertical direction can improve performance by about 12 to 25%, and a two-axis solar tracking technique capable of changing the angles of photovoltaic panels in both horizontal and vertical directions can improve performance by about 30 to 45%, compared to a case without solar tracking ability.

Furthermore, although different photovoltaic blind systems could be classified either into one-axis solar tracking technique alike or into two-axis solar tracking technique, the different photovoltaic blind systems may exhibit different improvements in the amount of power generation according to their solar tracking algorithms. Accordingly, there is a need for a more effective solar tracking algorithm.

Solar tracking approaches may be classified into three types: optical sensor-based approach for detecting direction of the sun in the sky using optical sensors to face toward the sun; generated power output-based approach for finding direction in which the output of photovoltaic power generation maximizes so as to control the directions of photovoltaic panels; and location and time-based approach using the direction of the sun predicted based on location and time.

The optical sensor-based approach operates, for example, to determine direction of the sun based on direction of an optical sensor that measures the strongest solar light among optical sensors oriented toward various directions. Accordingly, the approach requires optical sensors and further a means for determining direction of the sun from the detected signals of the optical sensors, and thus higher costs.

However, due to the features of the blind system, orientation toward the sun does not necessarily ensure maximizing output of generated power. For example, if blind slats are adjusted for facing toward the sun when the sun stands at its meridian altitude in midsummer, the blind slats are disposed almost horizontally, only resulting a situation in which the photovoltaic panels are mostly shaded.

Furthermore, generally, the wavelength range in which optical sensors are most sensitive does not coincide with the wavelength range in which actual power production gets large, and thus the identified direction of the sun does not necessarily guarantee the largest power production. Moreover, with bad weather conditions, erroneous operation of optical sensors is inevitable. Accordingly,—effectiveness to cost thereof can be rather poor.

In contrast, the generated power output-based approach is an approach for producing a direction, to which predicted power output maximizes, based on recent power output data. Although this approach is inexpensive because optical sensors are not required and insensitive to weather conditions, this method suffers from being difficult for implementation.

The location and time-based approach is an approach for predicting direction of the sun simply using latitude, longitude, and orientation of installation. Although this location and time-based method is also inexpensive because optical sensors are not required and also insensitive to weather conditions, this method suffers from low accuracy.

SUMMARY

At least some embodiments of the present invention are directed to the provision of a method for solar tracking, and an apparatus for solar tracking and a photovoltaic blind system using the same, which can maximize photovoltaic power output.

At least some embodiments of the present invention are directed to the provision of a method for solar tracking, and an apparatus for solar tracking and a photovoltaic blind system using the same, which can maximize photovoltaic power output without using optical sensors.

At least some embodiments of the present invention are directed to the provision of a method for solar tracking, and an apparatus for solar tracking and a photovoltaic blind system using the same, the method brilliantly interweaving an approach of solar tracking based on power output data and an approach of solar tracking based on location and time, thus capable of maximizing photovoltaic power output.

In accordance with an aspect of the present invention, there is provided a method for hybrid solar tracking using a computer, including: by a computer: generating first predicted power output data by analyzing first measured power output data of the past through time series analysis; generating a lagged error between the first measured power output data and the first predicted power output data; constructing a regression analysis (RA) model for predicting second predicted power output data based on the first measured power output data, the first predicted power output data and the lagged error, and deriving the second predicted power output data; constructing an artificial neural network (ANN) model for predicting third predicted power output data based on the first measured power output data, the first predicted power output data and the lagged error, and deriving the third predicted power output data; selecting either a method for solar tracking based on photovoltaic power output or a method for solar tracking based on location and time depending on whether the second measured power output data of the present time falls within a filtering range based on a first error range of the second predicted power output data and a second error range of the third predicted power output data; and determining the directions of photovoltaic panels according to the selected method for solar tracking.

The time series analysis of the first measured power output data may be based on auto-regressive integrated moving average (ARIMA) analysis or seasonal ARIMA (SARIMA) analysis.

The first error range or second error range may be a range that is determined by setting up upper and lower limits using one of a mean absolute percentage error (MAPE) and a standard error of regression (SER).

The filtering range may be a cross range in which the first error range and the second error range overlap each other.

The filtering range may be a range in which the upper and lower limits of the cross range, in which the first error range and the second error range overlap each other, have been extended by a predetermined tolerance range.

In accordance with another aspect of the present invention, there is provided a method for hybrid solar tracking using a computer, including: by a computer: generating first predicted power output data by analyzing first measured power output data of the past through time series analysis; generating a lagged error between the first measured power output data and the first predicted power output data; deriving second predicted power output data based on the first measured power output data, the first predicted power output data and the lagged error; selecting either a method for solar tracking based on photovoltaic power output or a method for solar tracking based on location and time depending on whether the second measured power output data of the present time falls within a filtering range based on an error range of the second predicted power output data; and determining the directions of photovoltaic panels according to the selected method for solar tracking.

Deriving the second predicted power output data may include constructing an RA model for predicting the second predicted power output data based on the first measured power output data, the first predicted power output data and the lagged error, and deriving the second predicted power output data according to the RA model.

Deriving the second predicted power output data may include constructing an ANN model for predicting third predicted power output data based on the first measured power output data, the first predicted power output data and the lagged error, and deriving the third predicted power output data according to the ANN model.

The time series analysis of the first measured power output data may be based on ARIMA analysis or SARIMA analysis.

In accordance with still another aspect of the present invention, there is provided an apparatus for hybrid solar tracking, including: a first power output prediction unit configured to generate first predicted power output data by analyzing first measured power output data of the past through time series analysis; a second power output prediction unit configured to obtain a lagged error between the first measured power output data and the first predicted power output data, to construct an RA model for predicting second predicted power output data based on the first measured power output data, the first predicted power output data and the lagged error, and to derive the second predicted power output data; a third power output prediction unit configured to construct an ANN model for predicting third predicted power output data based on the first measured power output data, the first predicted power output data and the lagged error, and to derive the third predicted power output data; and a solar tracking control unit configured to select either a method for solar tracking based on photovoltaic power output or a method for solar tracking based on location and time depending on whether the second measured power output data of the present time falls within a filtering range based on a first error range of the second predicted power output data and a second error range of the third predicted power output data, and to determine the directions of photovoltaic panels according to the selected method for solar tracking.

The time series analysis of the first measured power output data may be based on ARIMA analysis or SARIMA analysis.

The first error range or second error range may be a range that is determined by setting up upper and lower limits using one of an MAPE and an SER.

The filtering range may be a cross range in which the first error range and the second error range overlap each other.

The filtering range may be a range in which the upper and lower limits of the cross range, in which the first error range and the second error range overlap each other, have been extended by a predetermined tolerance range.

In accordance with still another aspect of the present invention, there is provided an apparatus for hybrid solar tracking, including a first power output prediction unit configured to generate first predicted power output data by analyzing first measured power output data of the past through time series analysis; a second power output prediction unit configured to obtain a lagged error between the first measured power output data and the first predicted power output data, and to predict second predicted power output data based on the first measured power output data, the first predicted power output data and the lagged error; and a solar tracking control unit configured to select either of a method for solar tracking based on photovoltaic power output or a method for solar tracking based on location and time, depending on whether the second measured power output data of the present time falls within a filtering range based on the error range of the second predicted power output data, and to determine the directions of photovoltaic panels according to the selected method for solar tracking.

The second power output prediction unit may be operable to: construct an RA model for predicting the second predicted power output data based on the first measured power output data, the first predicted power output data and the lagged error; and derive the second predicted power output data according to the RA model.

The second power output prediction unit may be operable to: construct an ANN model for predicting third predicted power output data based on the first measured power output data, the first predicted power output data and the lagged error; and derive the third predicted power output data according to the ANN model.

The time series analysis of the first measured power output data may be based on ARIMA analysis or SARIMA analysis.

In accordance with yet another aspect of the present invention, there is provided a photovoltaic blind system, including: a plurality of blind slats configured such that photovoltaic panels are attached thereto, respectively; a power amount measurement unit configured to measure power amounts generated by the photovoltaic panels; an apparatus for hybrid solar tracking; and a drive unit configured to control the directions of the blind slats according to the directions of the photovoltaic panels determined by the apparatus for hybrid solar tracking; wherein the apparatus for hybrid solar tracking includes: a first power output prediction unit configured to generate first predicted power output data by analyzing first measured power output data of the past through time series analysis; a second power output prediction unit configured to obtain a lagged error between the first measured power output data and the first predicted power output data, to construct an RA model for predicting second predicted power output data based on the first measured power output data, the first predicted power output data and the lagged error, and to derive the second predicted power output data; a third power output prediction unit configured to construct an ANN model for predicting third predicted power output data based on the first measured power output data, the first predicted power output data and the lagged error, and to derive the third predicted power output data; and a solar tracking control unit configured to select either of a method for solar tracking based on photovoltaic power output or a method for solar tracking based on location and time, depending on whether the second measured power output data of the present time falls within a filtering range based on a first error range of the second predicted power output data and a second error range of the third predicted power output data, and to determine the directions of photovoltaic panels according to the selected method for solar tracking.

The drive unit may be operable to: control eh vertical directions of the photovoltaic panels on the blind slats by controlling the angles of the blind slats in such a way as to wind or unwind ropes for the control of angles using wire pullers and motors according to the determined directions of the photovoltaic panels; and control the horizontal directions of the photovoltaic panels on the blind slats hung from a housing by rotating the overall housing in connection with a window frame in such a way as to drive gears, fastened to the housing and the window frame, respectively, using a motor.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

As to embodiments of the present invention disclosed herein, specific structural and functional descriptions are given merely for the purpose of illustrating the embodiments of the present invention. Embodiments of the present invention may be practiced in various forms, and the present invention should not be construed as being limited to the embodiments disclosed herein.

Embodiments of the present invention will be described in detail below with reference to the accompanying drawings. The same reference symbols will be used to denote the same components throughout the accompanying drawings, and redundant descriptions of the same components will be omitted.

Figure 1:
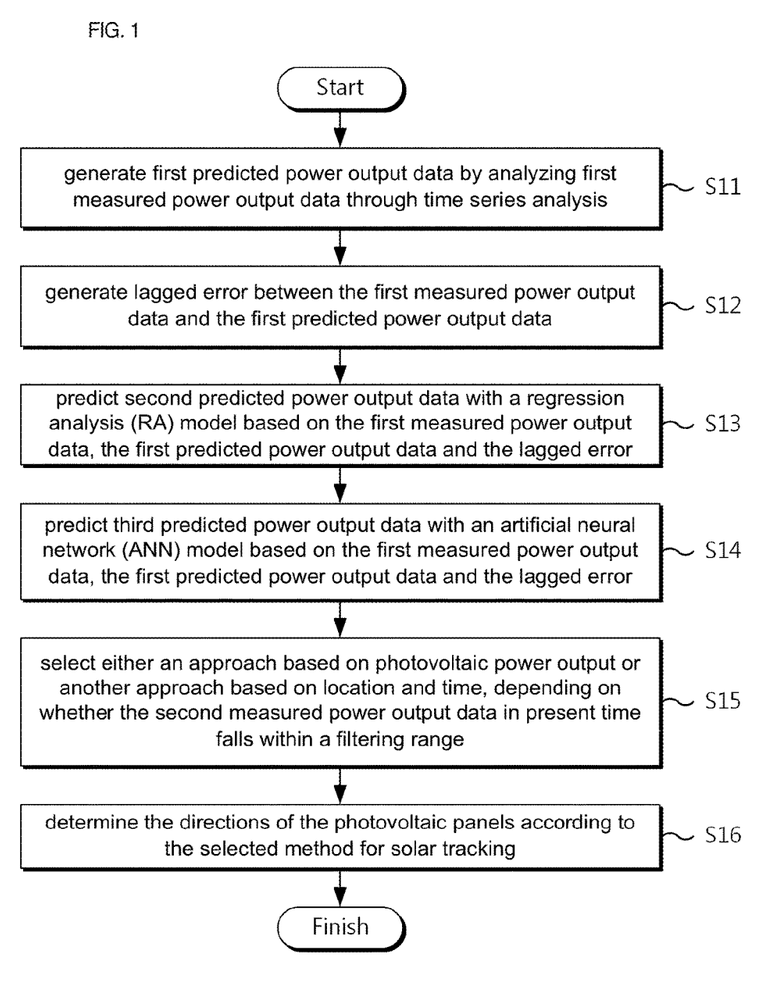
FIG. 1 is a flowchart illustrating a method for hybrid solar tracking according to embodiments of the present invention.

FIG. 1 is a flowchart illustrating a method for hybrid solar tracking according to embodiments of the present invention.

Referring to FIG. 1, the method for hybrid solar tracking using a computer according to embodiments of the present invention may start with performing step S11 by a computer as below.

At step S11, the computer may generate first predicted power output data by analyzing first measured power output data of the past through time series analysis.

A time series analysis technique is a methodology for analyzing a dynamic relation using the serial correlation between pieces of time series data. Among time series analysis techniques, the Box-Jenkins technique is a technique for predicting future data using the statistical characteristics of data itself without concerning the realistic meaning of the data, unlike other time series analysis techniques for finding the structural relation between specific variables, which describes a phenomenon. In particular, the Box-Jenkins technique is appropriate for a case in which data has periodicity and circularity, i.e., stationarity.

The Box-Jenkins technique is described using an auto-regressive integrated moving average (ARIMA) model, and a seasonal ARIMA (SARIMA) model into which seasonality has been incorporated may be also applied thereto.

The ARIMA model derives auto-regression and a moving average (MA) from data, which are compensated to have stationarity by removing non-stationarity through differencing, and verifies derived parameters by applying the parameters to the data. An appropriate ARIMA model may be constructed by repeating the derivation and verification of the parameters.

The SARIMA model is similar to the ARIMA model, and is only different from the ARIMA model in that parameters having seasonality are derived and verified.

Future data may be predicted from data of the past using the constructed ARIMA model or SARIMA model.

The Box-Jenkins technique, the ARIMA model, and the SARIMA model are well-known concepts introduced in the 1970s and developed since then, such that further detailed descriptions thereof are omitted.

A photovoltaic power output data of the past may undergo accidental fluctuations depending on weather conditions, but has periodicity and circularity in which power output increases and decreases daily, and seasonality in which power production is affected by the seasons. The ARIMA or SARIMA model is appropriate for the prediction of near future photovoltaic power output data.

Accordingly, at step S11, the computer may generate the first predicted power output data by analyzing the first measured power output data of the past through the time series analysis using the ARIMA or SARIMA model.

Although the time series analysis using the ARIMA or SARIMA model exhibits considerably good short-term prediction performance, the ARIMA or SARIMA model is problematic in that errors in time between predicted values and measured values, i.e., lagged errors, are not inherently taken into account.

In the present invention, in order to overcome this problem, a prediction result may be verified by considering the lagged error to be one of independent variables and predicting power output while taking into account the lagged error by using other prediction techniques.

For this purpose, at step S12, the computer may generate lagged error between the first measured power output data and the first predicted power output data, as shown in Equation 1 below:

$$e_t^s = Z_t - \hat{L}_t \quad (1)$$

where $e_t^s$ is the lagged error calculated at time t, $Z_t$ is the first measured power output data measured at time t, and $\hat{L}_t$ is the first predicted power output data predicted at time t using the SARIMA model.

Next, the present invention uses a regression analysis technique, such as a multiple regression analysis (MRA) technique, and an artificial neural network (ANN) technique as prediction techniques that are capable of taking into account lagged errors.

Inherently, in the multiple regression analysis technique or artificial neural network technique, it is very important how to set up independent variables that statistically describe a phenomenon. Accordingly, if someone uses the multiple regression analysis technique or artificial neural network technique to predict power output, one must set up carefully reviewed independent variables, such as weather factors, photovoltaic radiant energy and location, so as to predict power output as a dependent variable.

However, in the present invention, the advantage of the multiple regression analysis or artificial neural network analysis may be exploited without setting up specific independent variables by primarily obtaining predicted data using the Box-Jenkins technique, capable of prediction from the statistical characteristics of measured data itself, and then performing the multiple regression analysis or artificial neural network analysis using the predicted data, the measured data and the lagged error, instead of setting up the specific independent variables that describe a phenomenon.

For this purpose, at step S13, the computer may construct a regression analysis (RA) model for predicting second predicted power output data based on the first measured power output data, the first predicted power output data and the lagged error, as shown in Equation 2 below, and may derive the second predicted power output data:

$$\hat{Z}_t = f_{RA}(Z_{t-l}, \hat{L}_{t-m}, e_{t-n}^s) \quad (2)$$

where $\hat{Z}_t$ is the second predicted power output data predicted at time t, $f_{RA}$ is the regression analysis model, $Z_{t-l}$ is the first measured power output data measured at time t−l (l is an integer), $\hat{L}_{t-m}$ is the first predicted power output data predicted at time t−m (m is an integer), and $e_{t-n}^s$ is the lagged error calculated at time t−n (n is an integer). l, m and n are values related to a photovoltaic tracking time period. For example, when l=5, this may mean that the measured data have been obtained at the time 5 minutes ago.

In this case, since the first predicted power output data are predicted values based on the SARIMA or ARIMA model, step S13 may be viewed as a SARIMA-RA hybrid model that combines the regression analysis RA model with the SARIMA (or ARIMA) model to perform prediction.

Furthermore, at step S14, the computer may construct an artificial neural network (ANN) model for predicting third predicted power output data based on the first measured power output data, the first predicted power output data and the lagged error, as shown in Equation 3 below, and may derive the third predicted power output data:

$$\hat{Z}_t = f_{ANN}(Z_{t-l}, \hat{L}_{t-m}, e_{t-n}^s) \quad (3)$$

where $\hat{Z}_t$ is the third predicted power output data predicted at time t, $f_{ANN}$ is the artificial neural network model, $Z_{t-l}$ is the first measured power output data measured at time t−l (l is an integer), $\hat{L}_{t-m}$ is the first predicted power output data predicted at time t−m (m is an integer), and $e_{t-n}^s$ is the lagged error calculated at time t−n (n is an integer). l, m and n are values related to a photovoltaic tracking time period. For example, when l=5, this may mean that the measured data have been obtained at the time 5 minutes ago.

In the same manner, since the first predicted power output data are predicted values based on the SARIMA or ARIMA model, step S14 may be viewed as another hybrid model, i.e., a SARIMA-ANN hybrid model, which combines the ANN analysis model with the SARIMA (or ARIMA) model to perform prediction.

At step S13, the second predicted power output data are viewed as predicted data derived by particularly taking into account linear factors, whereas, at step S14, the third predicted power output data are viewed as predicted data derived by particularly taking into account nonlinear factors, such as cloud amount and precipitation.

Thereafter, at step S15, the computer may select either an approach for solar tracking based on photovoltaic power output or another approach for solar tracking based on location and time, depending on whether the second measured power output data in present time falls within an effective filtering range, based on a first error range of the second predicted power output data and a second error range of the third predicted power output data.

More specifically, either the first error range or the second error range is determined by setting up upper and lower limits using one of mean absolute percentage error (MAPE) and standard error of regression (SER).

The mean absolute percentage error (MAPE) is the average value of the absolute percentage error obtained by dividing the absolute value of the error between actual measured data and predicted data by the actual measured data, as shown in Equation 4 below:

$$f_{MAPE} = \frac{100}{m} \times \sum_{i=1}^{m} \left| \frac{(AV_i - PV_i)^2}{AV_i} \right| \quad (4)$$

where $f_{MAPE}$ is the mean absolute percentage error, m is the number of samples, i is sample index, AV is the actual measured data, and PV is the predicted data.

The standard error of regression described herein may be a percentage obtained by dividing a root mean square error (RMSE), called as the standard error of estimate, by the average of the actual measured data.

For example, when the mean absolute percentage error (MAPE) is used, the first error range is the same as Equation 5 below and the second error range is the same as Equation 6 below:

$$PV_{Hybrid-RA} \times \left(1 - \frac{MAPE_{Hybrid-RA}}{100}\right) \leq \tag{5}$$

$$PR_{Hybrid-RA} \leq PV_{Hybrid-RA} \times \left(1 + \frac{MAPE_{Hybrid-RA}}{100}\right)$$

where $PR_{Hybrid-RA}$ is the first error range of the SARIMA-RA hybrid model, $MAP_{Hybrid-RA}$ is the MAPE of the SARIMA-RA hybrid model, and $PV_{Hybrid-RA}$ is second predicted data derived from the SARIMA-RA hybrid model.

$$PV_{Hybrid-ANN} \times \left(1 - \frac{MAPE_{Hybrid-ANN}}{100}\right) \leq \tag{6}$$

$$PR_{Hybrid-ANN} \leq PV_{Hybrid-ANN} \times \left(1 + \frac{MAPE_{Hybrid-ANN}}{100}\right)$$

where $PR_{Hybrid-ANN}$ is the second error range of the SARIMA-ANN hybrid model, $MAPE_{Hybrid-ANN}$ is the MAPE of the SARIMA-ANN hybrid model, and $PV_{Hybrid-ANN}$ is third predicted data derived from the SARIMA-ANN hybrid model.

As described above, the first error range and the second error range may be determined in such a way that a designer appropriately sets up the upper and lower limits thereof according to the situation, context or intention.

Meanwhile, the filtering range (FR) is a cross range over which the first error range and the second error range overlap each other.

For example, when the first error range and the second error range overlap each other, the lower limit of the cross range is the larger one of the lower limit of the first error range and the lower limit of the second error range, and the upper limit of the cross range may be the smaller one of the upper limit of the first error range and the upper limit of the second error range, as shown in Equation 7 below:

$$\text{Max}(\text{Min}(PR_{Hybrid-RA}), \text{Min}(PR_{Hybrid-ANN})) \leq \text{CRMA}$$

$$\text{CRMA} \leq \text{Min}(\text{Max}(PR_{Hybrid-RA}), \text{Max}(PR_{Hybrid-ANN})) \tag{7}$$

where CRMA (a cross range between the predicted values of the MRA and ANN models) is the cross range, the lower limit of the CRMA is the larger one of the minimum value of $PR_{Hybrid-RA}$ and the minimum value of $PR_{Hybrid-ANN}$, and the upper limit of the CRMA is the smaller one of the maximum value of $PR_{Hybrid-RA}$ and the maximum value of $PR_{Hybrid-ANN}$.

If the first error range and the second error range do not overlap each other, the reason for this is that the error ranges are excessively strict or prediction models are erroneously constructed. In this case, it is necessary to set up the first and second error ranges again or to construct the prediction models again.

Furthermore, the filtering range itself may be somewhat extended depending on situations.

For example, the filtering range (FR) may be an extended range, being extended, by the predetermined tolerance range of the CRMA, from the upper and lower limits of the cross range, where the first error range and the second error range overlap each other, as shown in Equation 8 below:

$$\text{Min}(CRMA) \times \left(1 - \frac{TRCTMA}{100}\right) \leq FR \leq \text{Max}(CRMA) \times \left(1 + \frac{TRCRMA}{100}\right) \tag{8}$$

where CRMA is the cross range, FR is the filtering range, and TRCRMA is the tolerance range of the CRMA.

The tolerance range of the CRMA may be set up based on photovoltaic power output data accumulated, for example, for the one previous year.

When the second measured power output data of present time falls within the filtering range, this means that the method for solar tracking based on power output has functioned appropriately, and thus the method for solar tracking based on power output may continue to be used without change.

In contrast, when the second measured power output data of present time does not fall within the filtering range, this means that the method for solar tracking based on power output has not functioned appropriately, and thus the method for solar tracking based on power output needs to be replaced.

The method for solar tracking based on power output is a method for monitoring the photovoltaic power outputs of the slats of a blind system and controlling the directions of the slats with angles exhibiting the highest power output. Basically, the photovoltaic blind system of the present invention may use a method for solar tracking based on power output.

The method for solar tracking based on location and time is a method for controlling the directions of the slats toward the sun according to the coordinates of the earth coordinate system, at which the blind system is installed, and also according to the altitude and azimuth angles of the sun estimated according to the present time.

For example, the altitude angle of the sun may be calculated according to the present time and the current location, as shown in Equation 9 below:

$$a = \sin^{-1}(\sin d? \sin j \cos 利 \cos j \cos w) \tag{9}$$

where $\alpha$ is the altitude angle of the sun, $\delta$ is the declination of the sun, $\phi$ is the latitude at the current location, and $\omega$ is a value obtained by converting the present time into an angle. The declination of the sun $\delta$ can be given as $23.45 \times \sin[360/365 \times (n-284)]$, where n is the number of days counted from the beginning of each year.

The azimuth angle of the sun is an angle with the sun and projected location of the sun onto the horizontal plane of the photovoltaic panels, and may be calculated based on an altitude angle at the present time, as shown in Equation 10 below:

$$h = \sin^{-1} \frac{\cos \delta \cdot \sin \omega}{\cos a} \tag{10}$$

where h is the azimuth angle, $\delta$ is the declination of the sun, $\omega$ is a value obtained by converting the current time into an angle, and $\alpha$ is the altitude angle of the sun.

Figure 2:
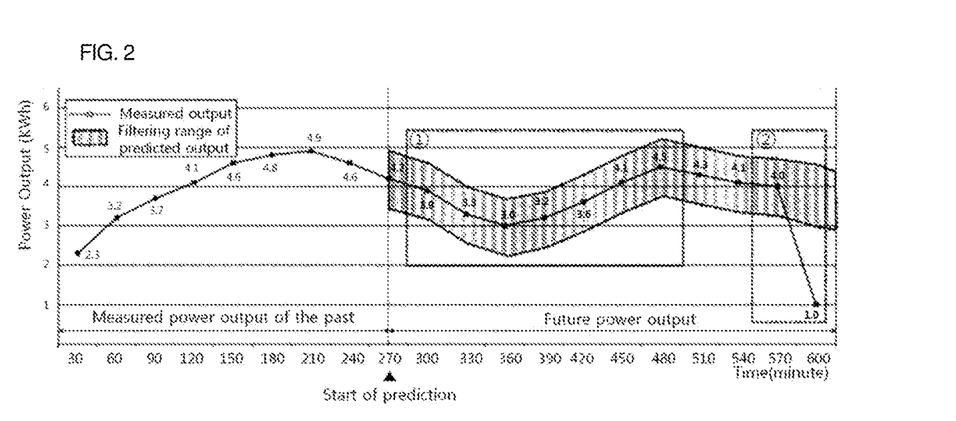
FIG. 2 is a conceptual diagram illustrating the changing tracking approaches depending on power output in a method for hybrid solar tracking according to embodiments of the present invention.

FIG. 2 is a conceptual diagram illustrating the replacement of tracking methods depending on power output in a method for hybrid solar tracking according to embodiments of the present invention.

Referring to FIG. 2, the filtering range of the predicted power output data, predicted either via a hybrid model of the SARIMA model (or ARIMA model) and the RA model or a hybrid model of the SARIMA model (or ARIMA model) and the ANN model, is illustrated as a band shape, and the actually acquired predicted power output data is illustrated as a dotted connecting line.

The prediction is performed on or after 270 minutes on the time axis. It can be seen that the measured power output data falls within the filtering range of the predicted data in section ①, and thus the photovoltaic power generation has been achieved as predicted.

In section ②, between 570 and 600 minutes, as power output rapidly decreases due to weather factors, the measured power output data considerably departs from the filtering range of the predicted data. In this case, the prediction based on power output is considered not working, and then a method for solar tracking based on location and time replaces as the method for solar tracking.

Finally, at step S16, the computer may determine the directions of the photovoltaic panels according to the selected method for solar tracking.

The directions of the photovoltaic panels may be controlled, for example, by a two-axis direction control method for controlling horizontal and vertical azimuths.

Figure 3:
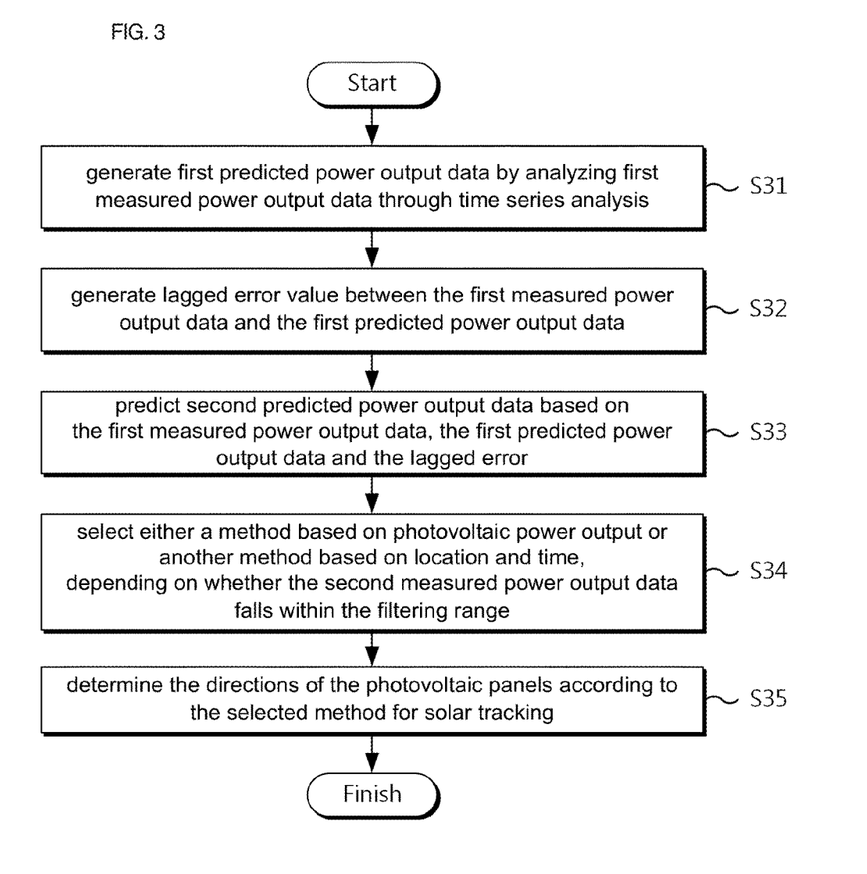
FIG. 3 is a flowchart illustrating a method for hybrid solar tracking according to embodiments of the present invention.

FIG. 3 is a flowchart illustrating a method for hybrid solar tracking according to embodiments of the present invention.

Referring to FIG. 3, a method for hybrid solar tracking using a computer may start with step S31 of generating, by the computer, first predicted power output data by analyzing first measured power output data of the past through time series analysis.

In an embodiment, the time series analysis of the first measured power output data may be based on the ARIMA or SARIMA analysis.

At step S32, the computer may generate lagged error value between the first measured power output data and the first predicted power output data.

Steps S31 and S32 of FIG. 3 may be substantially the same as steps S11 and S12 of FIG. 1.

At step S33, the computer may predict second predicted power output data based on the first measured power output data, the first predicted power output data and the lagged error.

In an embodiment, more specifically, step S33 may include the step of constructing, by the computer, the regression analysis (RA) model for predicting the second predicted power output data based on the first measured power output data, the first predicted power output data and the lagged error, and the step of deriving, by the computer, the second predicted power output data according to the regression analysis model.

In an embodiment, more specifically, step S33 may include the step of constructing, by the computer, the artificial neural network (ANN) model for predicting the second predicted power output data based on the first measured power output data, the first predicted power output data and the lagged error, and the step of deriving, by the computer, the second predicted power output data according to the artificial neural network model.

At step S34, the computer may select either a method for solar tracking based on photovoltaic power output or a method for solar tracking based on location and time, depending on whether the second measured power output data of the present time falls within the filtering range based on the first error range of the second predicted power output data.

Since the filtering range is set up using one prediction model in the embodiment of FIG. 3 unlike the filtering range that is set up using two prediction models together in the embodiment of FIG. 1, the filtering range may be the same as the error range of the prediction model used.

The error range or filtering range may be determined in such a way that a designer appropriately sets up the upper and lower limits thereof according to the situation, context or intention.

In an embodiment, for example, the filtering range may be a range in which the upper and lower limits of the error range have been extended by the predetermined tolerance range of the CRMA.

The tolerance range of the CRMA may be set up based on photovoltaic power output data accumulated, for example, for the previous year.

Finally, step S35 may include the step of determining, by the computer, the directions of the photovoltaic panels according to the selected method for solar tracking.

Figure 4:
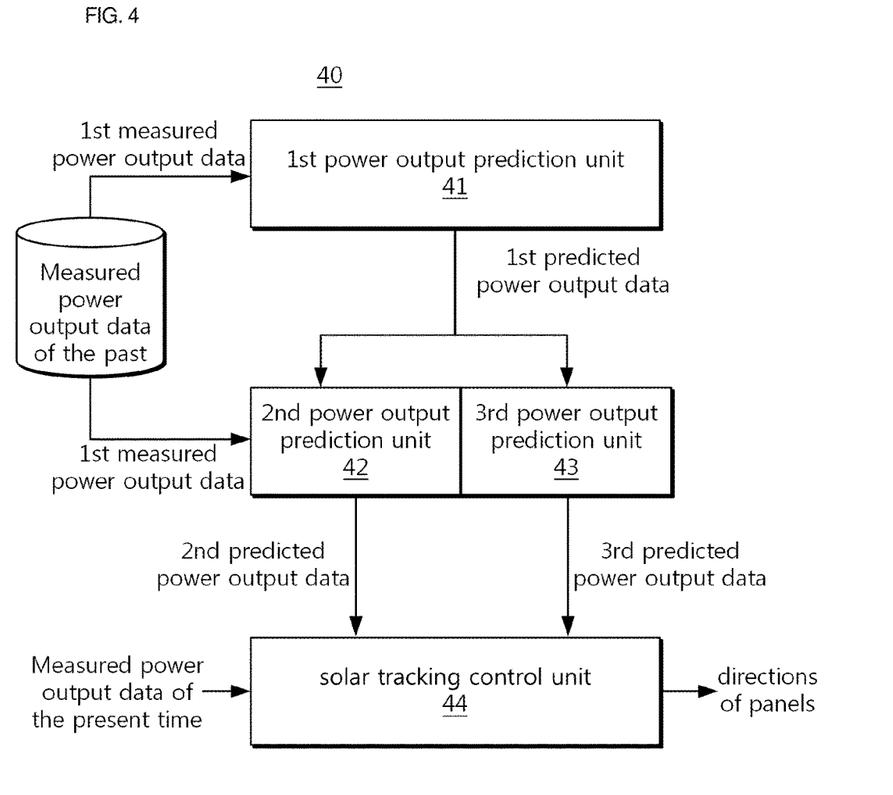
FIG. 4 is a block diagram illustrating an apparatus for hybrid solar tracking according to embodiments of the present invention.

FIG. 4 is a block diagram illustrating an apparatus 40 for hybrid solar tracking according to embodiments of the present invention.

Referring to FIG. 4, the apparatus 40 for hybrid solar tracking according to the present embodiment may include a first power output prediction unit 41, a second power output prediction unit 42, a third power output prediction unit 43, and a solar tracking control unit 44.

The first power output prediction unit 41 may generate first predicted power output data by analyzing first measured power output data of the past through time series analysis.

In an embodiment, the time series analysis of the first measured power output data may be based on ARIMA or SARIMA analysis.

The second power output prediction unit 42 may obtain the lagged error between the first measured power output data and the first predicted power output data, may construct a regression analysis (RA) model for predicting second predicted power output data based on the first measured power output data, the first predicted power output data and the lagged error, and may derive second predicted power output data.

The third power output prediction unit 43 may construct an artificial neural network (ANN) model for predicting third predicted power output data based on the first measured power output data, the first predicted power output data and the lagged error, and may derive the third predicted power output data.

The solar tracking control unit 44 may select either a method for solar tracking based on photovoltaic power output or a method for solar tracking based on location and time, depending on whether the second measured power output data of the present time falls within a filtering range based on the first error range of the second predicted power output data and the second error range of the third predicted power output data. The solar tracking control unit may determine the directions of the photovoltaic panels according to the selected method for solar tracking.

In this case, the first error range or second error range is a range that is determined by setting up upper and lower limits, for example, using one of a mean absolute percentage error (MAPE) and a standard error of regression (SER).

In an embodiment, the filtering range is a cross range in which the first error range and the second error range overlap each other.

In an embodiment, the filtering range is a range in which the upper and lower limits of the cross range, in which the first error range and the second error range overlap each other, have been extended by the predetermined tolerance range of the CRMA.

Figure 5:
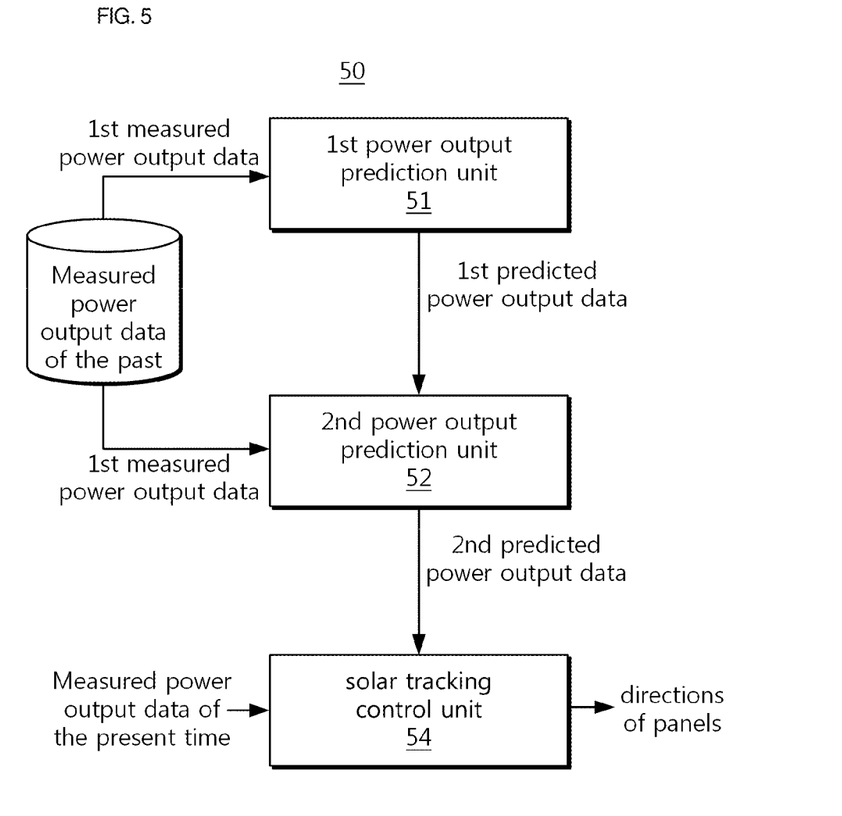
FIG. 5 is a block diagram illustrating an apparatus for hybrid solar tracking according to embodiments of the present invention.

FIG. 5 is a block diagram illustrating an apparatus 50 for hybrid solar tracking according to embodiments of the present invention.

Referring to FIG. 5, since the filtering range is set up using one prediction model in the embodiment of FIG. 5 unlike the filtering range that is set up using two prediction models together in the embodiment of FIG. 4, the error range of the prediction model used may be used as the filtering range without a change.

The apparatus 50 for hybrid solar tracking according to the present embodiment may include a first power output prediction unit 51, a second power output prediction unit 52, and a solar tracking control unit 54.

The first power output prediction unit 51 may generate outputfirst predicted power output data by analyzing first measured power output data of the past through time series analysis.

In an embodiment, the time series analysis of first measured power output data may be based on ARIMA or SARIMA analysis.

The second power output prediction unit 52 may obtain a lagged error value between first measured power output data and the first predicted power output data, and may predict second predicted power output data based on the first measured power output data, the first predicted power output data and the lagged error.

In an embodiment, the second power output prediction unit 52 may construct a regression analysis (RA) model for predicting second predicted power output data based on the first measured power output data, the first predicted power output data and the lagged error, and may derive the second predicted power output data according to the regression analysis model.

In an embodiment, the second power output prediction unit 52 may construct an artificial neural network (ANN) model for predicting second predicted power output data based on the first measured power output data, the first predicted power output data and the lagged error, and may derive the second predicted power output data according to the artificial neural network model.

The solar tracking control unit 54 may select either a method for solar tracking based on photovoltaic power output or a method for solar tracking based on location and time, depending on whether the second measured power output data of the present time falls within a filtering range based on the error range of the second predicted power output data, and may determine the directions of the photovoltaic panels according to the selected method for solar tracking.

Figure 6:
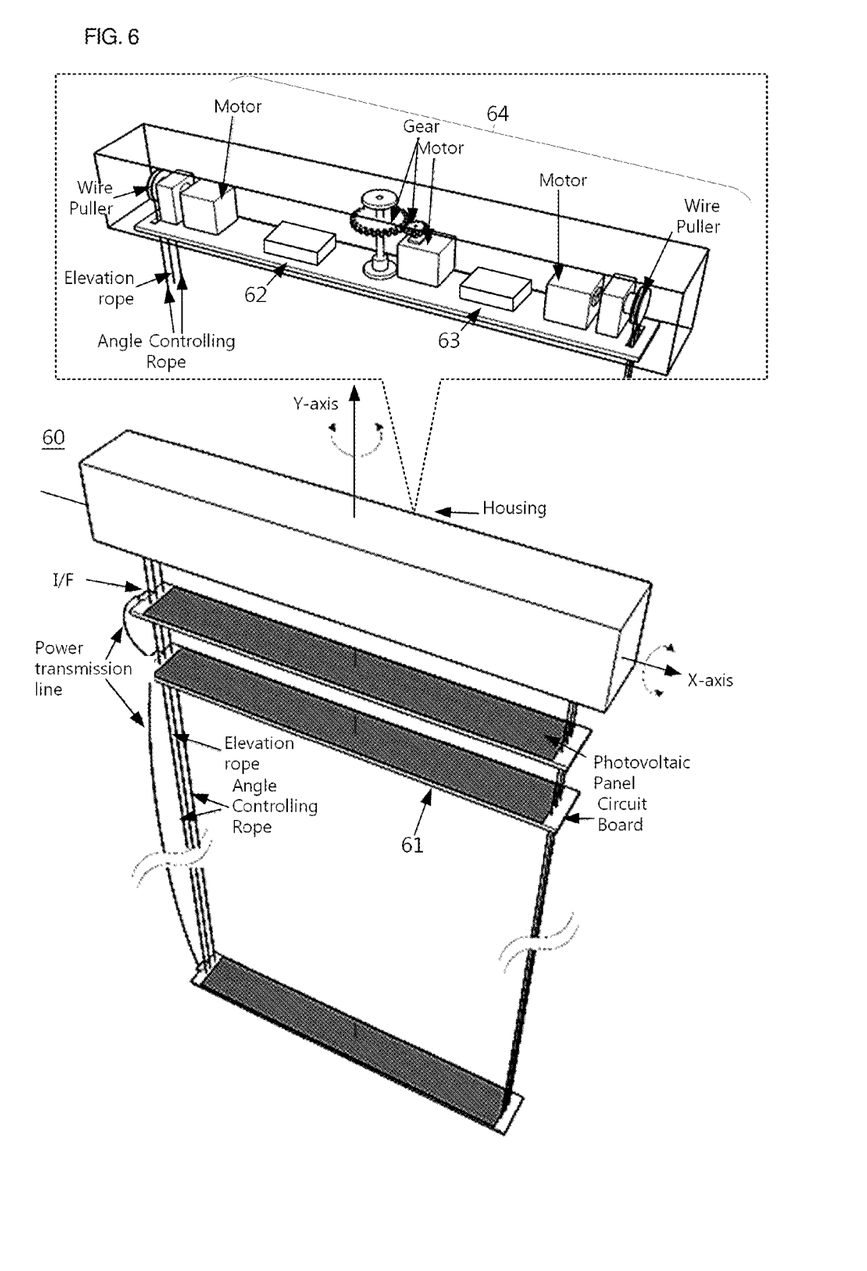
FIG. 6 is a perspective view illustrating a photovoltaic blind system according to embodiments of the present invention.

FIG. 6 is a perspective view illustrating a photovoltaic blind system 60 according to embodiments of the present invention.

Referring to FIG. 6, the photovoltaic blind system 60 may include a plurality of blind slats 61, a power amount measurement unit 62, an apparatus 63 for hybrid solar tracking, and a drive unit 64.

The plurality of blind slats 61 is formed in a shape that is narrow and that extends longitudinally. A photovoltaic panel is attached to upper surface of each of the plurality of blind slats 61. Each blind slat 61, at two opposite shorter ends or one shorter end thereof, may include ropes configured to control angles, another rope configured to selectively elevate and lower the slats, and a circuit board configured such that electrical interfaces for connecting transmission lines for transmitting signals and power and other necessary electric circuits are formed thereon.

Components for controlling the driving and power generation of the blind slats 61 may be included in a housing installed above the blind slats.

For example, the power amount measurement unit 62, the apparatus 63 for hybrid solar tracking, and the drive unit 64 may be all included in the housing.

The power amount measurement unit 62 may measure a total power output generated by photovoltaic panels.

The apparatus 63 for hybrid solar tracking corresponds to the apparatuses 40 and 50 for hybrid solar tracking described above in conjunction with FIGS. 4 and 5.

The drive unit 64 may control the vertical directions of the photovoltaic panels on the blind slats by controlling the angles of the blind slats in such a way as to wind or unwind the ropes for the control of angles using wire pullers and motors according to the directions of the photovoltaic panels determined by the apparatus 63 for hybrid solar tracking.

Furthermore, the drive unit 64 may control the horizontal directions of the photovoltaic panels on the blind slats hung from the housing by rotating the overall housing in connection with a window frame in such a way as to drive gears, fastened to the housing and the window frame, respectively, using a motor.

Figure 7:
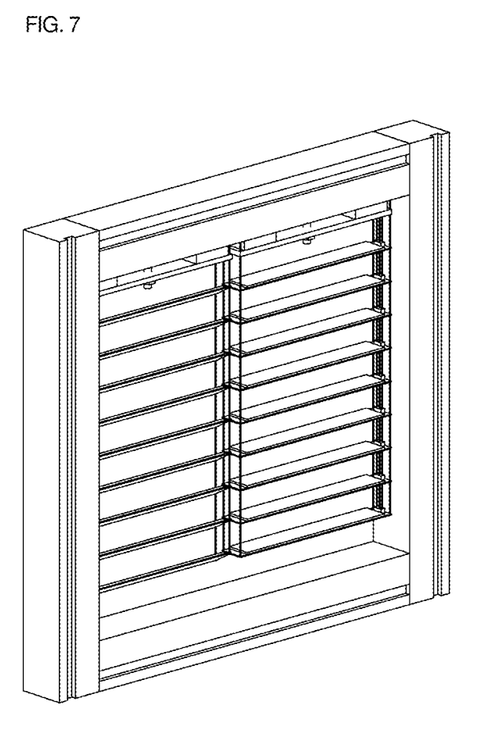
FIG. 7 is a photo illustrating a prototype of a photovoltaic blind system according to embodiments of the present invention.

FIG. 7 is a view illustrating a prototype of a photovoltaic blind system according to an embodiment of the present invention.

Referring to FIG. 7, a plurality of blind slats, to which respective photovoltaic panels are attached, is disposed from top to bottom in a structure similar to that of conventional blinds, and a rope for elevation and lowering and ropes for the control of angles are provided on the left and right sides of the slats. Interfaces connected to transmission lines to transmit generated power are provided on the sides of the blind slats.

The transmission lines are introduced into the housing that may also function as a window frame. The power output measurement unit, the apparatus for hybrid solar tracking, the drive unit, and a battery may be installed inside the housing. A rotatable fastening unit is installed on the bottom of the housing to allow a blind slat set to be rotated in a horizontal direction, and thus the overall blind slat set may be horizontally and gradually rotated by the drive unit. Furthermore, the wire puller is installed on the bottom of the housing, and thus the blind slats may be elevated or lowered by winding or unwinding a rope for elevation and lowering, or the vertical angles of the blind slates may be gradually controlled by winding or unwinding the ropes for the control of angles.

In accordance with the method for hybrid solar tracking, and the apparatus for solar tracking and the photovoltaic blind system using the same according to at least some embodiments of the present invention, photovoltaic power output can be maximized without using optical sensors.

In accordance with the method for hybrid solar tracking, and the apparatus for solar tracking and the photovoltaic blind system using the same according to at least some embodiments of the present invention, photovoltaic power output can be maximized taking into account seasonality and stationarity.

In accordance with the method for hybrid solar tracking, and the apparatus for solar tracking and the photovoltaic blind system using the same according to at least some embodiments of the present invention, a method for solar tracking based on output data and a method for solar tracking based on location and time are combined in intelligent manner, and thus photovoltaic power output can be maximized.

The above embodiments and the accompanying drawings are intended merely to clearly illustrate part of the technical spirit of the present invention, and it will be apparent to those skilled in the art that modifications and specific embodiments that those skilled in the art can easily derive from the present specification and the accompanying drawings are all included in the range of the rights of the present invention.

Furthermore, the apparatus according to the present invention may be implemented as computer-readable code that is stored in computer-readable storage medium. The computer-readable storage medium includes all types of storage device in which computer system-readable data can be stored. Examples of the storage medium include read only memory (ROM), random access memory (RAM), optical disks, magnetic tape, floppy disks, hard disks, non-volatile memory, etc. Furthermore, the computer-readable storage medium may be distributed among computer systems connected over a network so that computer-readable code can be stored and executed in a distributed manner.

What is claimed is:

1. A photovoltaic blind system, comprising:
a plurality of blind slats configured such that photovoltaic panels are attached thereto, respectively;
a power amount measurement unit configured to measure power amounts generated by the photovoltaic panels;
an apparatus for hybrid solar tracking; and
a drive unit configured to control directions of the blind slats according to directions of the photovoltaic panels determined by the apparatus for hybrid solar tracking;
wherein the apparatus for hybrid solar tracking comprises:
a first power output prediction unit configured to generate first predicted power output data by analyzing first measured power output data of the past through time series analysis;
a second power output prediction unit configured to obtain a lagged error between the first measured power output data and the first predicted power output data, to construct an RA model for predicting second predicted power output data based on the first measured power output data, the first predicted power output data and the lagged error, and to derive the second predicted power output data;
a third power output prediction unit configured to construct an ANN model for predicting third predicted power output data according to the following equation to derive the third predicted power output data:

$$\{\widehat{Z}\}_t = f_{ANN}(Z_{t-1}, \{\widehat{L}\}_{t-m}, e_{t-n}^s),$$

where $\{\widehat{Z}\}_t$ is the third predicted power output data predicted at time t, $f_{ANN}$ is the artificial neural network model, $Z_{t-1}$ is the first measured power output data measured at time t−l (l is an integer), $\{\widehat{L}\}_{t-m}$ is the first predicted power output data predicted at time t−m (m is an integer), and $e_{t-n}^s$ is the lagged error calculated at time t−n (n is an integer);
a solar tracking control unit configured to select either a method for solar tracking based on photovoltaic power output or a method for solar tracking based on location and time, depending on whether the second measured power output data of the present time falls within a filtering range based on a first error range of the second predicted power output data and a second error range of the third predicted power output data, and to determine the directions of photovoltaic panels according to the selected method for solar tracking,
wherein the drive unit is operable to:
control vertical directions of the photovoltaic panels on the blind slats by controlling angles of the blind slats in such a way as to wind or unwind ropes for the control of angles using wire pullers and motors according to the determined directions of the photovoltaic panels; and
control horizontal directions of the photovoltaic panels on the blind slats hung from a housing including the drive unit and the apparatus for hybrid solar tracking by rotating the housing connected to a window frame in such a way as to drive gears, fastened to the housing and the window frame, respectively, using a motor.

2. The photovoltaic blind system of claim 1, wherein the time series analysis of the first measured power output data is based on auto-regressive integrated moving average (ARIMA) analysis or seasonal ARIMA (SARIMA) analysis.

3. The photovoltaic blind system of claim 1, wherein the first error range or second error range is a range that is determined by setting up upper and lower limits using one of a mean absolute percentage error (MAPE) and a standard error of regression (SER).

4. The photovoltaic blind system of claim 1, wherein the filtering range is a cross range in which the first error range and the second error range overlap each other.

5. The photovoltaic blind system of claim 4, wherein the filtering range is a range in which upper and lower limits of the cross range, in which the first error range and the second error range overlap each other, have been extended by a predetermined tolerance range.

* * * * *